United States Patent
Mina

Patent Number: 5,762,452
Date of Patent: Jun. 9, 1998

[54] LONG CUTTING LENGTH MILLING CUTTER

[76] Inventor: Livio Mina, Via Dei Mille 22, Brescia, Italy

[21] Appl. No.: 644,660

[22] Filed: Apr. 24, 1996

[30] Foreign Application Priority Data

Jan. 12, 1996 [IT] Italy .................. BS96 A 000003

[51] Int. Cl.⁶ ........................................ B23C 5/20
[52] U.S. Cl. .................. 407/34; 407/56; 407/61
[58] Field of Search ................ 407/34, 42, 61, 407/56, 55

[56] References Cited

U.S. PATENT DOCUMENTS

| | | | |
|---|---|---|---|
| 4,093,392 | 6/1978 | Hopkins | 407/55 X |
| 4,182,587 | 1/1980 | Striegl | 407/55 X |
| 4,519,731 | 5/1985 | Jester et al. | 407/56 X |
| 4,844,666 | 7/1989 | Tsujimura et al. | 407/34 |
| 4,934,880 | 6/1990 | Stashko | 407/42 X |
| 5,083,887 | 1/1992 | Dotany | 407/61 X |
| 5,425,603 | 6/1995 | Dutchke et al. | 407/55 X |

FOREIGN PATENT DOCUMENTS 002502999  10/1982  France ...................... 407/34

*Primary Examiner*—A. L. Pitts
*Assistant Examiner*—Henry W.H. Tsai
*Attorney, Agent, or Firm*—McGlew and Tuttle

[57] ABSTRACT

The present invention pertains to a long cutting length milling cutter with inserts with hole with cutting edge inserts which are arranged on various levels in the axial direction from a front end of the said milling cutter body. The inserts of the various levels are arranged according to steps, whose mean height, excluding the thickness of the insert belonging to the step or seat, is not less than the thickness of the insert. The radial angle $\delta$, which is formed by the radius of the milling cutter body passing through the vertex of the cutting edge of an insert with the straight line parallel to the base of the insert and passing through the vertex of the insert, has an amplitude not less than 10°.

12 Claims, 1 Drawing Sheet

LONG CUTTING LENGTH MILLING CUTTER

FIELD OF THE INVENTION

The present invention is aimed at the insert milling cutters with long or deep cutting length, which are also called "hedgehog milling cutters" "or inserted blade milling cutters" in practice.

The milling cutters with inserts having long cutting length are used as an alternative to those having continuous cutting edges for the purpose of reducing the operating and maintenance costs.

The concepts and the pertinent terminology according to the national and international standards or according to how they are used in industrial practice are used in the description below.

The milling cutters with considerable cutting length are mainly used for cutting out, or at any rate, in cases in which the axial cutting depth is more prevalent on the radial depth, i.e., on the milling width. For the purpose of reducing the highly variable impact and amplitude stresses, such conditions of use require a relatively high number of cutting edges and a "helical" shape, with marked angle of axial inclination, of the cutting edges themselves, as it is well known from the milling cutters made of steel, from the milling cutters having cutting edges made of brazed hard metal and from the milling cutters having mechanically fastened blades made of hard metal.

BACKGROUND OF THE INVENTION

On the subject of milling cutters with inserts having an increased cutting depth, there are two basic embodiments in the current state of the art.

A first known embodiment provides for inserts arranged according to helices in the clockwise or the counterclockwise direction, which are spaced apart from one another and have an "overlap" of the spaces between inserts, which is obtained by staggering the inserts on a helix with respect to those on the preceding helix. As a result, a "whole" cutting edge is formed by the cutting edges of the inserts on two or more helices.

This embodiment has the advantage of requiring a lower number of inserts than that necessary for other embodiments, but has the disadvantage of having a much lower number of actual cutting edges compared to that of other embodiments, respectively reduced by half if the overlap occurs between the inserts on two helices and by one third if it occurs between the inserts on three helices and so forth. Thus, with the feed/cutting edge supportable by one insert having been arranged in advance, the feed rate is reduced by half, by one third, etc. with a resulting increase in the production times and costs.

A second embodiment also provides for helical cutting edges, but suitably adjacent inserts on each helix: in the case of positive rake inserts, with a smallest overlapping permitted by the presence of the relief rake of the said inserts; in the case of negative rake inserts, using the negative inclination for the continuity of the helical cutting edge.

This second embodiment provides for a greater number of inserts, but it also has a greater number of "complete cutting edges" than that of the preceding embodiment, thus permitting faster feeds and thus reducing the production times and costs.

However, in the milling cutters which correspond to the second embodiment, the chip cut by the cutting edge of each insert is practically as wide as the length of the cutting edge of the insert, as is also affirmed by the description of the patents in this field. Thus, the cutting edge insert may be subjected to often very high stresses, with the risk of the cutting edge breaking, especially in the milling of hard steels or materials that are difficult to machine or even of having to reduce the feed of the milling cutter with a resulting deleterious increase in the production times.

In order to avoid these considerable disadvantages, milling cutters have been placed on the market, which thus have helices with adjacent inserts, but in which inserts gaps are present, which split up each cutting edge and thus the shaving cut by them, thus falling again, however, within some of the drawbacks of the milling cutters according to the first embodiment.

In both embodiments, the plane, which determines the cutting face of the insert mounted on the milling cutter, i.e., the plane containing the vertices or noses of the cutting edges parallel to the base plane of the insert, is almost radial (as also described and specified or absolutely claimed in the patent literature), i.e., passing through the axis of rotation of the milling cutter.

SUMMARY AND OBJECTS OF THE INVENTION

The present invention is aimed at finding a solution for the disadvantages of the embodiments of the milling cutters with inserts having long cutting length known in the state of the art, while at the same time offering greater advantages than those of the said embodiments.

The present invention is based on two principal features:

elimination of the presence of the "helices" with the introduction of the concept of "step-type cutting edges;" and introduction of the concept of positioning the plane of the cutting face parallel to the radial plane, but much higher (forwards) in terms of the cutting direction.

According to the invention, a long cutting length milling cutter is provided with inserts defining a hole. The milling cutter includes a cylindrical milling cutter body with cutting inserts on various levels in an axial direction from a front end of the body. Each insert is housed with, or supported on, its base and is fastened on a seat in a relief space of the chip discharging. The inserts on the various levels, and correspondingly the respective seats are arranged in a step configuration. A mean height of the steps, excluding a thickness of the insert belonging to the step or seat, is not less than the thickness of the insert.

The radial angle which is formed by the radius of the milling cutting body passing through the vertex or nose of the cutting edge of the insert with the straight line parallel to the base of the insert and also passing through the vertex of the insert, has an amplitude which is not less than 10°. The step having a seat for housing and fastening an insert on a next level with a wall or elevation wherein a cavity, in which a part of an insert arranged on an adjacent level reenters, is present on the wall or elevation between two adjacent steps. The wall between two adjacent steps has a cavity, into which a portion of the insert mounted on the next adjacent level is recessed, such that the inserts on an adjacent level are partially hidden under the inserts on a different level. In the cutting operation, the cutting edge is engaged with a full thickness of the chip over a length that is less than the length of the cutting edge of the insert. The amount whereby an insert is recessed axially with the respect to the next adjacent insert can be varied from one axial level to another.

These features are particularly advantageous if inserts provided with a central hole are used for fastening the inserts to the milling cutter in the respective housings (commonly called "seats") by means of screws. Since the use of these inserts is currently extremely widespread, the present invention refers particularly to milling cutters provided for the use of these inserts.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
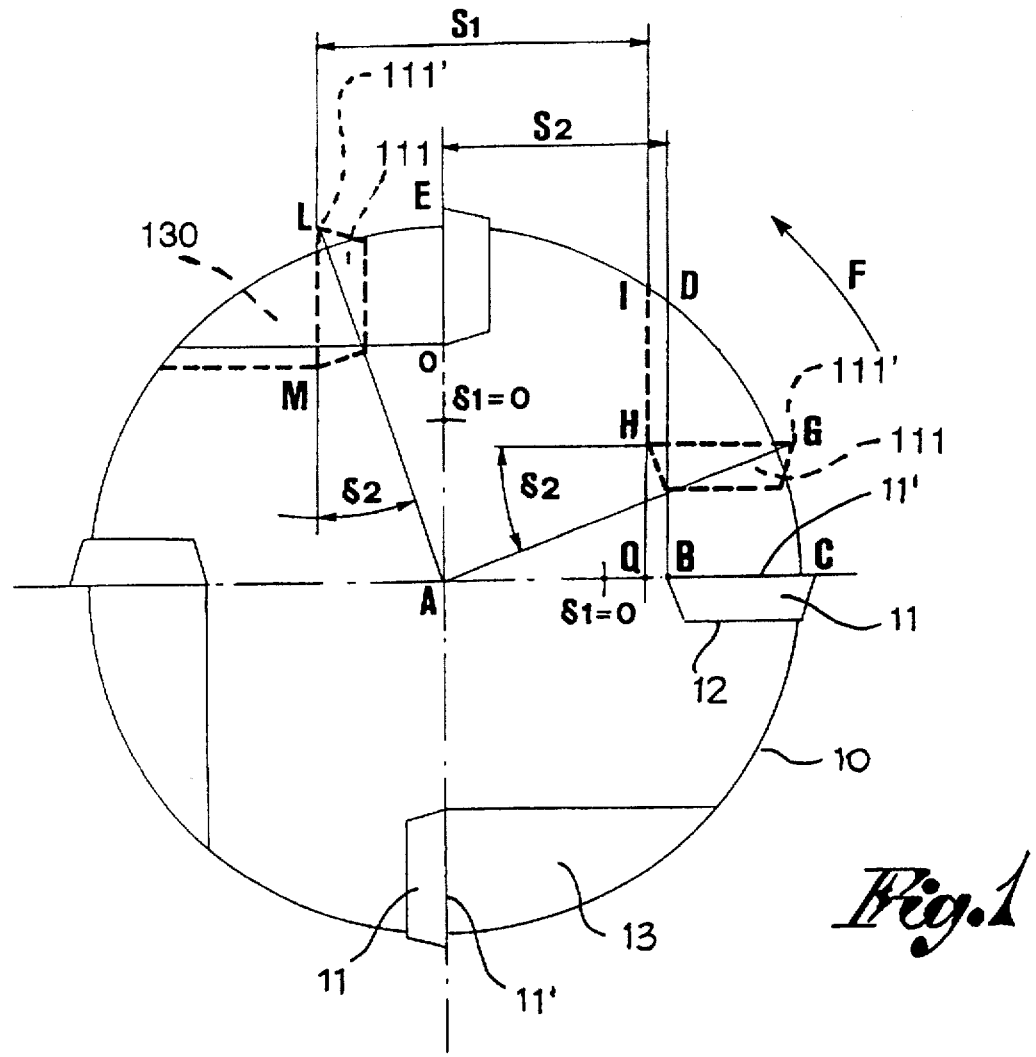
FIG. 1 is a schematic view of the milling cutter with conventional and present invention inserts viewed in the axial direction.

In FIG. 1, a milling cutter body is globally indicated by 10, and conventional cutting inserts with a hole. Each of the conventional inserts 11 is arranged and fastened in a respective housing 12 by means of a screw (not shown). In FIG. 1 as well, and for a comparison with the prior art, the continuous lines schematically show the milling cutter body 10 and the arrangement of the conventional inserts 11, while the dotted lines schematically show the milling cutter body and the arrangement of the inserts 111 (only some for simplicity's sake) according to the present invention. According to the conventional arrangement (continuous lines), each insert 11 has the cutting face 11' in the radial plane of the milling cutter body 10, and the housing or seat 12 is shaped analogously; according to the novel arrangement of the present invention (dotted lines), each insert 111 has the cutting face 111, in a plane, which is parallel to the radial plane of the milling cutter body, but in a higher or more advanced position, in the direction F of rotation of the milling cutter, i.e., in the direction of cutting, and the housing 120 of the insert 111 is modified analogously.

FIG. 1 schematically shows a milling cutter having four cutting edges, since, with this milling cutter, the mathematical equations are simpler; the present invention is, however, valid for any number of cutting edges, as can be demonstrated, even if with less simple mathematical expressions.

Also in FIG. 1, the following references indicate:

AC Radius r of the milling cutter;

BC=HG Width b of the insert 11 (or of the chip clearance 13 if made different than the width of the insert);

BD Height of the wall of the chip clearance space 13 in the conventional milling cutter;

HI Height of the wall of the chip clearance 130 in the milling cutter according to the present invention;

QH,OM Height of position of the insert according to the present invention compared with the position of the insert in the conventional milling cutter;

QB Approach to the axis of the milling cutter from the wall of the chip clearance 13 due to QH;

C,E Nose of the cutting edge of the inserts 11 in the conventional milling cutters;

G,L Vertex of the cutting edge of the inserts 111 in the milling cutters according to the present invention;

Distance of the nose of the cutting edge of an insert from the wall of the relief space 13 of the preceding insert in the conventional milling cutter;

S2 Distance of the nose of the cutting edge of an insert from the wall of the relief space 13 of the preceding insert in the milling cutter according to the present invention;

$\delta 1$ Radial angle (zero) in the conventional milling cutters, where the cutting face 12' of the insert is in the radial plane;

$\delta 2$ Radial angle in the milling cutter according to the present invention with "step-type" cutting edges.

Figure 2:
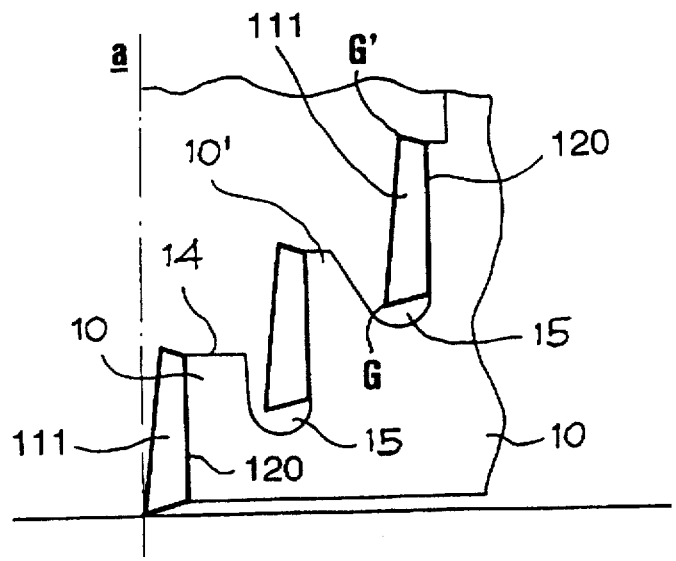
FIG. 2 is a schematic view of a segment of the development of the periphery of the milling cutter according to the present invention.

Moreover, in FIG. 2, GG' defines the cutting edge of an insert, which corresponds to a straight line segment parallel to the axis of rotation of the milling cutter.

From the above, it is easy to see that a "forward" adjustment (QH, OM) of the insert brings about only a small reduction (QB) in the distance of the wall of the relief space 13 of the shaving from the axis of rotation, but also a very large increase in the distance (S2) of the cutting face of the insert from the wall of the relief space (13) of the shaving of the preceding insert. Then, as has been indicated, considering $\delta 1$ to be the radial angle of the cutting edge of the reference milling cutter in question (which is $\delta 1=0°$ in the conventional milling cutter with its cutting face on a radial plane) and $\delta 2$ to be the radial angle of the cutting edge of the milling cutter according to the present invention, which is derived from the equation $\delta 2$=arc sin (distance of the cutting face from the radial plane/radius of the milling cutter), the mathematical/trigonometric equations, which link S1 and S2 and thus express their difference and their ratio, respectively, are:

$$S2 - S1 = r(\cos \delta 2 - \sin \delta 2 - 1)$$

$$\frac{S2}{S1} = \frac{r(\cos \delta 2 - \sin \delta 2) - b}{r - b}$$

Subtracting the thickness of the insert from S1 and from S2, respectively, the thickness of the segment 10' of the milling cutter body under the insert is obtained, i.e., the thickness of the material, steel, of the milling cutter body which supports the insert.

It is easy to ascertain that radial angles $\delta 2$ having an amplitude (for the hedgehog cutters having very different diameters) of at least 20° (up to about 45°) lead to a thickness of the support material under the insert that is so great as to make it possible to abolish the concept of "helix" and introduce the concept of "steps," as mentioned above and as is more apparent in FIG. 2. Each step defines the seat 12, on which is fastened the insert 11 and a wall or elevation 14 joining one step with the next one.

The great thickness of the material under the inserts and the resulting considerable height of the steps make it possible to provide, in the wall or elevation 14 of the step belonging to an insert, a deep cavity 15, in which to house part of the insert on a different axial level. Therefore, part of an insert is to be found under the insert of the level which precedes or follows it, depending on the clockwise or counterclockwise arrangement of the steps.

This is especially true for the inserts of the first level (front level, i.e., at the free end of the milling cutter body) and of the second level, whose inserts penetrate under those of the first level, while for the inserts on other levels, the same effect may be obtained with broader spaces that are provided also for achieving further objectives, while always keeping the support of the insert very sturdy.

The present invention described above makes it possible to achieve the following objectives:

- to obtain a cutting progressiveness of the milling cutter that is greater than that permitted by the inserts arranged on helices,
- to reduce the amplitude of the cutting edge section engaged in the cutting, thus reducing the width or, more accurately, the cut section of the chip, in order to take into account the machinability features of the materials to be milled,
- to reduce the stresses, to which the cutting edge is subjected, in particular protecting the end of the cutting edge, towards the nose G, which is exposed more to the dangers of yielding.

Therefore, the present invention represents a considerable advancement in the economy of machining operations, both as a higher yield and duration of the milling cutter and as protection of the milling machine, on which the milling cutter is used. Actually, thanks to the reduction in the cutting stresses and in the danger of vibrations resulting from using the milling cutters according to the present invention, the milling machines are less stressed and may thus maintain their precision features for a longer time, with less need for maintenance.

It is particularly important to note that the part of the insert "under" the adjacent insert (and thus also the axial depth of the associated housing cavity) may be provided differently in the various levels of inserts, in order to adjust the cutting edge part engaged in the cutting under the conditions, in which the inserts of the individual levels are operating, e.g., the amount of material to be removed in the milling, the volume of the cut chip and its removal.

Finally, it should be noted that each insert may have, as is, moreover, known in the state of the art, an inclination of the cutting edge GG', which is obtained in the insert itself, or by giving a suitable axial inclination to its seat, or even by both means.

While specific embodiments of the invention have been shown and described in detail to illustrate the application of the principles of the invention, it will be understood that the invention may be embodied otherwise without departing from such principles.

What is claimed is:

1. A milling cutter, comprising:

a milling cutter body;

inserts including a cutting edge, said inserts being positioned on different levels in an axial direction from a front end of the milling cutter body, each of said inserts being housed with a base and being fastened on a seat in a chip clearance space provided on said body, said inserts and respective seats being arranged as steps wherein a mean height of said steps, excluding a thickness of an individual said insert belonging to a step or seat, is not less than a thickness of said insert, a radial angle, formed by a radius of said milling cutter body passing through a nose of said cutting edge of an insert with a straight line parallel to a base of the insert and also passing through said nose of the insert has an amplitude of not less than 10 degrees.

2. A milling cutter according to claim 1, wherein said step is provided with said seat for housing and fastening one of said inserts on a level, said step being joined with a step having an adjacent seat for housing and fastening an insert on a next level with a wall or elevation, a cavity, in which a part of an insert arranged on an adjacent level reenters, is present in said wall or elevation between two adjacent steps wherein inserts on an adjacent level are provided with parts that are positioned under inserts on a different level.

3. A milling cutter according to claim 2, wherein said cutting edge is engaged for cutting chips, a full thickness of the chips having a length less than said cutting edge of the insert.

4. A milling cutter according to claim 2, wherein an axial reentry of said insert with respect to an adjacent said insert has a different amplitude depending on a different axial level of said insert.

5. A milling cutter according to claim 3, wherein an axial reentry of said insert with respect to an adjacent said insert has a different amplitude depending on a different axial level of said insert.

6. A milling cutter comprising:

a milling cutter body defining a plurality of chip clearance spaces positioned at a plurality of different axial levels of said cutter body, said clearance spaces including a seat;

a plurality of inserts including cutting edges and bases, each of said inserts being connected by a respective said base to one of said seats, a radial line passing through a tip of said cutting edge forming a first line, a second line being formed parallel to said seat and passing through said tip, an angle between said first and second line being greater than or equal to 10 degrees.

7. A milling cutter in accordance with claim 6, wherein:

said plurality of inserts are positioned with said bases of adjacent said inserts axially overlapping.

8. A milling cutter in accordance with claim 6, wherein:

each of said seats form part of a separate step, each said step defining a cavity in communication with an adjacent said clearance space.

9. A milling cutter in accordance with claim 8, wherein:

a respective said insert in said adjacent clearance space being partially positioned in said cavity.

10. A milling cutter in accordance with claim 6, wherein:

each of said inserts define a hole.

11. A milling cutter in accordance with claim 6, wherein:

said inserts are positive rake inserts.

12. A milling cutter in accordance with claim 6, wherein:

said plurality of inserts are positioned with said bases of adjacent said inserts axially overlapping;

each of said seats form part of a separate step, each said step defining a cavity in communication with an adjacent said clearance space, a respective said insert in said adjacent clearance space being partially positioned in said cavity;

each of said inserts define a hole, and said inserts are positive inserts.

* * * * *